March 2, 1943.  J. F. HULME  2,312,338
ANCHOR BOLT INSERT
Filed Sept. 24, 1941
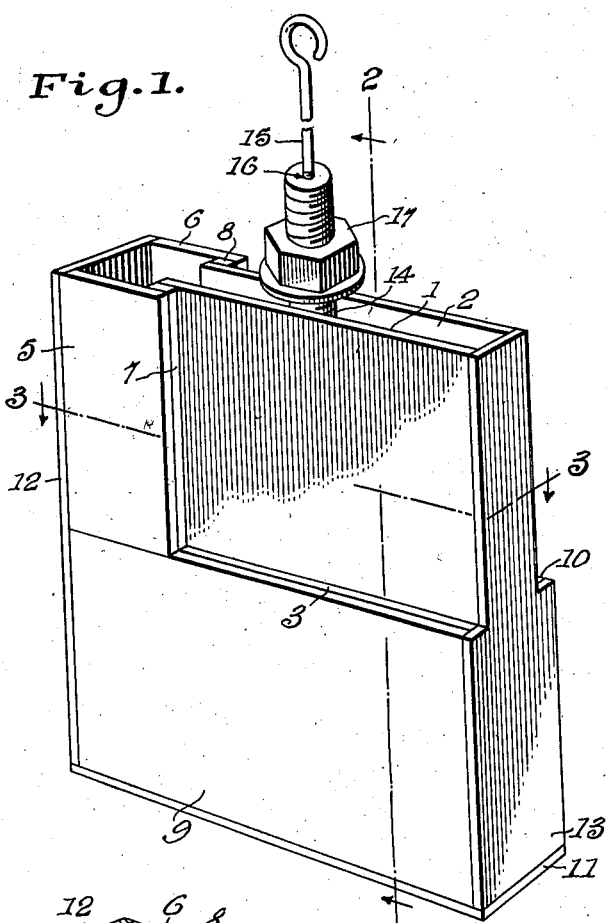
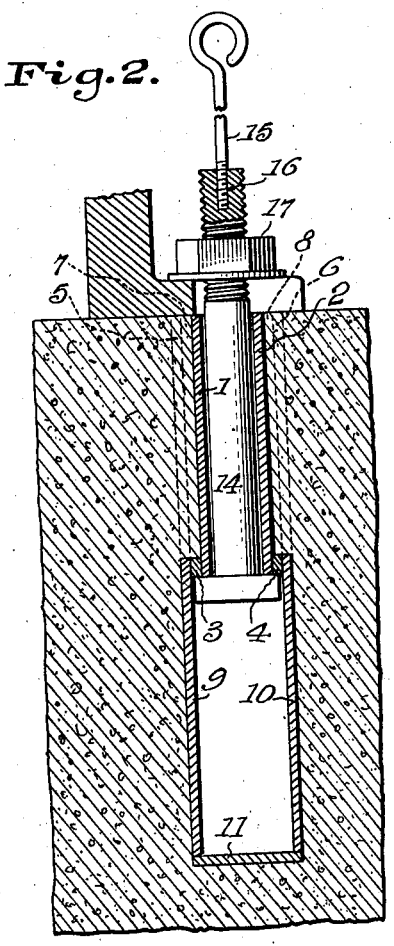
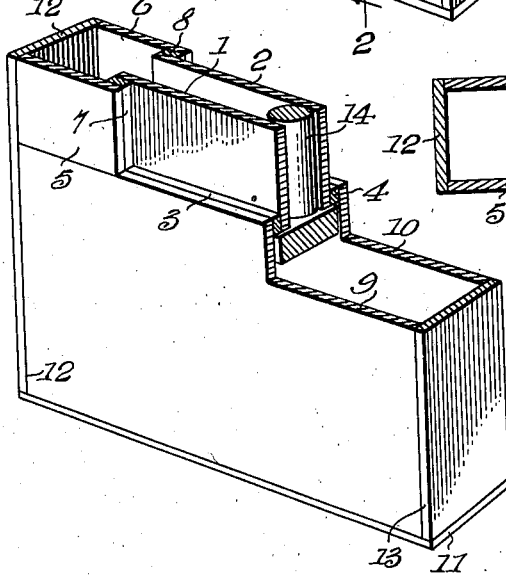
Inventor
John F. Hulme
By Francis F. Vandewater and Joseph H. Crowe
Attorneys Patented Mar. 2, 1943

2,312,338

UNITED STATES PATENT OFFICE 2,312,338

ANCHOR BOLT INSERT

John Frederic Hulme, United States Army

Application September 24, 1941, Serial No. 412,113

2 Claims. (Cl. 72—105)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to inserts adapted to be embedded in a supporting medium and having an opening in the outer face thereof through which a bolt, by means of which objects may be securely attached in position to the base structure, is free to move horizontally and vertically within predetermined limits.

It is an object of this invention to provide an insert, adapted to receive an anchor bolt for holding heavy objects receiving great mechanical vibration or sudden shocks, and having indented sides whereby the greater portion of the stress is absorbed by the supporting medium.

It is a further object of this invention to provide an insert and anchor bolt which will present a level surface when the bolt is released, whereby the minimum amount of lifting will be necessary when it is desired to move the member.

It is a still further object of this invention to provide an anchor bolt insert in which the bolt is free to move both vertically and horizontally so that the bolt may be adjusted to the form of the particular member to be secured.

Still another object of this invention is to provide an anchorage in which the greater part of the stress produced by the anchor bolt is absorbed by compression resistance rather than by sheer resistance.

Other objects of this invention and the various advantages and characteristics of the present insert will be apparent from a consideration of the following detailed description.

The invention consists in the several novel features which are hereinafter set forth and are more particularly defined by claims at the conclusion hereof:

Fig. 1 is a perspective of an insert embodying one form of the invention;

Fig. 2 is a section on the line 2—2 of Fig. 1;

Fig. 3 is a section on the line 3—3 of Fig. 1;

Fig. 4 is a sectionalized view of Fig. 1.

Similar characters of reference designate similar parts in the different views.

The invention consists of an insert preferably constructed of metal sheets and straps welded together where their surfaces meet. It comprises a base plate 11 on the long sides of which are welded two rectangular members 9 and 10. On the back of the member 11 is welded another rectangular member 12 of a height sufficient to extend substantially above the side members 9 and 10. Members 5 and 6 are rectangular plates welded to members 12, 9 and 12, 10 respectively and form a well of sufficient size to receive the head of the anchor bolt 14. Members 4 and 8 are straps welded to the upper and inner edges of members 10 and 6 respectively and help to form a ledge adapted to engage the head of bolt 14 when the device is in use. Similarly members 3 7 are welded to members 5 and 9 for the same purpose. Members 1 and 2 are plates welded to members 3, 7 and 4, 8 respectively and perform the dual function of forming a channel adapted to act as a guide for the shaft of the bolt 14 and to act as a part of the step with which the head of the bolt 14 becomes engaged. Member 13 is a plate welded to the open end of the insert and is shaped in conformity therewith. The anchor bolt 14 is provided at its threaded end with a drilled and tapped hole 16 adapted to be engaged by the threaded end of the extractor 15. Nut 17 is provided to fasten the anchor bolt 14 to the object to be anchored.

The insert thus constructed is made of sufficient depth so that an anchor bolt when inserted in it will be entirely enclosed, thereby allowing the insert to present a level surface when the bolts are released. The insert may be made of sufficient length so that a number of bolts may be placed therein and all the attaching members of one side of the object to be secured and in line may be attached to the same insert.

The extractor 15 is preferably constructed of such a size that the nut 17 will slide over it, thus enabling the bolts to be held in their elevated position until the nut is fastened.

In use one or more inserts, constructed according to the invention, are placed in a form, open ends up, parallel to each other and with their center lines placed the same distance apart as that of the center lines of anchor holes in the machine or object to be anchored and located where it is desired to anchor the machine or object. Then a reinforced material such as concrete, asphalt, macadam or the like is poured around them leaving only the tops exposed. The inserts form a guide for bolts 14 which are inserted in the well formed by members 5 and 6. The bolts are limited in their lateral movement by members 1 and 2. Bolts 14 are placed in the insert so as to be directly under the holes in the supporting member of the machine or object to be anchored. The machine or object is then placed in position and extractor rods 15 engaged in the threaded hole 16 in the bolts 14 and the bolts drawn upward to a position where they can be engaged by the hold-down nuts 17.

When it is desired to remove or replace an anchored machine or object it is only necessary to remove the nuts 17 from the anchor bolts 14. The bolts will drop in the insert, which is of greater depth than the length of the bolts, thus leaving a smooth even floor surface over which the machine may be easily moved with the minimum of clearance.

It will be seen that by my invention I have provided an anchor having a maximum of its surface presented to the supporting medium. An anchor constructed according to the invention will be less liable to failure since the surrounding medium will cover the ledge and act as an added support to the anchor bolt.

While I have shown the insert as being constructed of flat plates and straps, it is obvious that other methods may be used without departing from the spirit of the invention. For some purposes it may be desirable to form the insert by suitable dies from one or more pieces of sheet material.

I do not desire to be limited by the details of construction and arrangement herein shown and described, and any changes or modifications may be made therein within the scope of the subjoined claims.

Having described my invention what I claim as new and wish to secure by Letters Patent is:

1. An insert adapted to be embedded in a supporting medium, comprising an elongated channel shaped member having side walls and end walls, said side walls having upper and lower portions, said upper portion being vertically outwardly offset with respect to the remainder of said upper portion at one end, whereby a securing member may be inserted in said channel shaped member, said lower portion being in the plane of said outwardly offset end of said upper portion, all the components of said side and end walls being in planes perpendicular to the base of said channel shaped member, and said end walls being shaped to conform to the cross-section of said channel member.

2. An insert adapted to be embedded in a supporting medium, comprising an elongated channel shaped member having side walls and end walls, said side walls having offset upper and lower portions, said upper portion being horizontally inwardly offset from said lower portion, said upper portion also having an outwardly vertically offset portion at one end, whereby a securing member may be inserted in said channel shaped member, all the components of said side and end walls being in planes perpendicular to the base of said channel shaped member and said end walls being shaped to conform to the cross-section of said channel shaped member.

JOHN FREDERIC HULME.